United States Patent [19]

Dunn et al.

[11] 4,034,121
[45] July 5, 1977

[54] FOODS WITH MICROCRYSTALLINE CHITIN

[75] Inventors: Howard J. Dunn, Lomita; M. Paul Farr, San Pedro, both of Calif.

[73] Assignee: Ralston Purina Company, St. Louis, Mo.

[22] Filed: Nov. 13, 1972

[21] Appl. No.: 306,341

Related U.S. Application Data

[63] Continuation of Ser. No. 178,457, Sept. 7, 1971, Pat. No. 3,847,897.

[52] U.S. Cl. .............................. 426/565; 426/531; 426/658; 426/654; 426/589; 426/605; 426/633; 426/580; 426/583; 426/628; 426/579

[51] Int. Cl.² .................................. A23L 1/325

[58] Field of Search .......... 426/129, 130, 131, 164, 426/167, 185, 189, 196, 203, 205, 209, 213, 531, 658, 589, 565, 605, 633, 580, 583, 628, 579, 654; 260/211 R

[56] References Cited

UNITED STATES PATENTS

| | | | |
|---|---|---|---|
| 3,023,104 | 2/1962 | Battista | 426/167 X |
| 3,251,824 | 5/1966 | Battista | 260/211 R |
| 3,847,897 | 11/1974 | Dunn et al. | 426/654 X |

*Primary Examiner*—Joseph M. Golian
*Attorney, Agent, or Firm*—Veo Peoples, Jr.; Howard Olevsky

[57] ABSTRACT

Microcrystalline chitin is prepared by subjecting chitin to controlled acid hydrolysis and high shear while suspended in an aqueous medium.

7 Claims, No Drawings

FOODS WITH MICROCRYSTALLINE CHITIN

This application is a continuation of the application entitled MICROCRYSTALLINE CHITIN, Ser. No. 178,457 filed Sept. 7, 1971, now U.S. Pat. No. 3,847,897.

This invention relates to the production of a thixotropic thickener and stabilizer made from chitin.

Chitin is a homopolysacchoride that occurs as a structural compound in lobster, shrimp and crab shells as well as some insects and fungi. The crustacean shells contain calcium carbonate, protein and other compounds, but it is chitin that is mainly responsible for the rigidity of the tissue. The repeating unit of the chitin polymer is 2-N-acetyl glucosamine.

As further described in the text entitled *Organic Colloids* by Bruno Jirgensons, Elsevier Publishing Co. (1958) p402 et. seq., the chitin polymer is insoluble in water, alcohol, dilute acids, alkalies and lipophilic solvents. It is also extremely resistant to enzymatic action. Chemical treatment with alkalies deacetylates the polymer while complete hydrolytic degradation by hot concentrated acid gives glucosamine and acetic acid in equal amounts and theoretical yields. Hydrolytic cleavage of an unspecified extent gradually occurs when the chitin polymer is subjected to concentrated acid hydrolysis.

It is known that useful water soluble derivatives of chitin can be prepared by chemical alteration of the basic polymeric units e.g. by normal etherification, esterification or xanthation procedures.

Microcrystalline cellulose and collagen are also known. In the latter case, water insoluble collagen salts having a pH of about 3.2 and capable of forming a gel are used as a thickener in a food composition, see Japanese Patent No. 7,119,569 issued to Food Machinery and Chemical Corp., San Jose, California.

In the former case, when purified cellulose is subjected to hydrolysis with a hot mineral acid, as described by O. A. Battista et al in U.S. Pat. No. 2,978,446, and then subjected to high shear forces while in aqueous solution, a gel-like thixotropic dispersion results with the microcrystalline cellulose as the suspensoid. The above described property of microcrystalline cellulose has resulted in its wide use throughout the food industry as a thickener for aqueous food systems and as a stabilizer.

It has now been found that a non-chemically altered, microcrystalline chitin product can be made which is functionally superior to microcrystalline cellulose as a thickener and stabilizer, and in its resistance to certain severe food processes.

For the practice of this invention, shrimp and crab shells provide excellent sources of chitin. As a matter of fact, disposal of these shells has become a significant solid waste disposal problem in recent years. The teachings of this invention, by providing a use for these shells, will help to alleviate this problem.

The procedure of extraction and purification of chitin from the shells of crustacea is well known and is described, for example, in the Journal of Science of Food and Agriculture, Vol. 2 No. 12p571 (1951). Briefly the process involves the steps of substantial grinding, then washing the ground shells in aqueous 0.5 − 6.0 N caustic soda solution for 20 minutes or so with agitation to emulsify fat and solubilize protein which may cling to the shells. The shell fragments are then subjected to acid washing with HCl at a concentration of 0.5 − 6.0 N for about 20 minutes or so. Acid washing removes inorganic impurities, particularly calcium carbonate and phosphate.

(If a whitened end product is desired, extraction of the ground untreated chitin to remove the Xantophyllic, and similar pigments with a suitable solvent such as Quackenbush solvent, i.e., a mixture of hexane, acetone, alcohol and toluene can be performed with no apparent effect on the properties of the end product).

The purified chitin which may or may not be dried and neutralized is then ready for the controlled mineral acid hydrolysis which produces the product of this invention. The hydrolysis is preferably conducted in boiling acid to keep the process time at a realistic minimum and the process description hereinafter presupposes boiling acid hydrolysis. It should be understood, however, that hydrolysis can be carried out with the acid maintained at less than its boiling point. Acid concentrations are between 0.5N and 6.0N and process times from 5 to 60 minutes are preferred for the hydrolysis although there is seldom any reason to exceed 2.5 N acid concentration and it is still possible to get a satisfactory product with the higher acid concentration.

Hydrochloric acid is preferred for hydrolysis. If HCl is used, hydrolysis can be easily combined with the acid washing step used to purify the chitin, thereby, eliminating the need to remove the residual washing acid. When HCl is the hydrolytic medium, the acid washing step is conducted at 60° C. for 20 − 30 minutes and the temperature of the HCl raised to boiling to start the hydrolysis. Hydrolysis conducted in 1.7 normal HCl for 30 minutes is presently preferred.

It should be noted that, of course, some acid hydrolysis of the type described below takes place during the acid washing step. The extent of the acid washing step will therefore have an effect on the length of the hydrolysis necessary to produce the product of this invention. With the acid wash currently preferred, as described above, a hydrolysis time of about 5 minutes is sufficient to produce the product. Longer times, as described above, are preferred because mechanical removal and separation steps may be carried on during the hydrolysis and there is no adverse effect on the thickening properties of the chitin regardless of the time of hydrolysis within the preferred time span of 5 to 60 minutes or even longer.

Controlled acid hydrolysis of ground, purified chitin as defined for the purposes of this application is an acid treatment which is insufficient to deacetylate, deaminate or hydrolytically cleave the polymeric glycosidic bonds, but adequate to enable the somewhat randomly spaced rupture of these same glycosidic bonds when these particles are subjected to high shear forces of the type described below.

It is, likely, as Battista has stated regarding cellulose, that the particles are operative as thickeners only when they reach a certain size range. (Battista asserts that the colloidal size is the critical size for cellulose particles.) Therefore, as the length and severity of the shear applied to the suspended particles increase, the random rupturing of the glycosidic linkages also increases, producing a larger number of smaller sized microscopic particles. As described in the Examples, increases in shear do in fact produce corresponding increases in the viscosity of the resultant dispersion. Although the above description is only theory, it does help explain the extreme thixotropic nature of a suspension of these particles which have been subjected to extensive shear forces.

In order to "set up" the chitin to form a stable viscous dispersion, it only need be suspended in aqueous media and subjected to sufficient shear forces. Mechanical home blenders or commercially available homogenizers such as those used in the processing of mayonnaise or for homogenization of milk, are examples of machines which can easily provide adequate shear.

If some chitin particles, at this point, are removed and examined microscopically under polarized light, they reflect that light as a crystalline material would and similarly to microcrystalline cellulose, hence the term microcrystalline chitin is believed technically proper.

Particle concentrations of from 0.5% to 25% by weight have provided acceptable increases in viscosity when subject to blending on a household blender for a period of about 5 to about 60 minutes, although an increase in the amount of chitin will not produce a corresponding increase in viscosity.

The pH of the suspending media also has an effect on the resulting dispersion. The viscosity of the resultant dispersion increases as the pH increases with a maximum dispersion viscosity occurring at a pH of about 10, although there is only a slight difference in viscosity from pH 4 to 10. At pH levels below 4 the dispersion viscosity decreases.

If, in the process of "setting up" the suspension, the shearing action is carried on for a short period of time and then stopped, the chitin will settle out of suspension but in smaller amounts than that originally suspended. As the shear continues, the viscosity of the media increases and the amount of separately visible particles decrease until, if the grinding is stopped, few particles settle out. The majority of the particles may be seen under an optical microscope at this stage. As shear is continued, the media appears thick, uniform and gel-like, and when shear is stopped and examination attempted with an optical microscope of a portion of the mass, very few particles are visible under 1600X magnification. These facts also serve to buttress the theory that there is a critical size range, perhaps colloidal, in which the chitin acts as a thickener.

Examples of the product and process of this invention follow.

In all of the Examples, unless otherwise noted, the source of chitin was king crab, although chitin from all crustaceans perform equally well. The chitin in all Examples was purified in the following manner. Raw shell was ground in a hammer mill to particle sizes of about 0.6 cm and boiled for 20 minutes in 1N Na OH solution. The resultant broth was screened to collect the chitin particles and separate them from the liquid. The particles were then rinsed thoroughly with water, drained and resuspended in 1N HCl for 20 minutes at 60° C. The particles were drained, repeatedly rinsed to remove traces of acid and dried to a moisture level of 5%. (It takes about 5 grams of raw shell material to produce 1 gm of purified chitin.)

The purified chitin was acid hydrolyzed, which produced a physical softening of the material, by boiling in 2.5 normal HCl for 20 minutes. The acid was drained and the chitin was washed with water to remove residual acid, dried to a moisture content of 5% and ground into a powder. The chitin is ready to be "set up" at this point.

When a blender was used as the device for applying shear in these Examples, it was a Waring Blender Model No. 5010S made by Waring Products Division of Dynamics Corp. of America. The blender was always used at its highest setting.

Except as otherwise noted, all viscosity measurements in the Examples were performed on a Brookfield L. U. Viscometer with a No. 3 spindle rotating at 30 RPM. All comparative Examples were performed using "Avicel." "Avicel" is a trademark of the Food Machinery and Chemical Corporation and refers to the crystalline cellulose described in the Battista patent referred to above. (It should be noted that, recently, Food Machinery and Chemical Corporation has produced modified crystalline celluloses with a number designation after the "Avicel" trademark. These Examples, however, were all run with the original, unmodified crystalline cellulose sold as "Avicel" without any such added designation.)

EXAMPLE 1

This Example is designed to show the effect of the length of time of controlled acid hydrolysis on viscosity of a series of dispersions made with the resultant chitin samples.

Purified, ground chitin samples were subjected to controlled acid hydrolysis in 2.0N HCl for various times as indicated in the table below. 17.5 gm of each sample was blended with 250 gm of water to produce a 5% mixture for 15 minutes in a Waring Blender. The comparatively short blending time was used to enhance the change in viscosity attributable to the length of the acid hydrolysis. The table below correlates the time of hydrolysis with the viscosities resultant from the dispersions of the products of these hydrolyses.

Table 1

| Time of Hydrolysis | Viscosity |
|---|---|
| 0 | 1910 |
| 5 | 510 |
| 10 | 492 |
| 20 | 480 |
| 50 | 475 |
| 90 | 470 |
| 110 | 466 |

The relatively high viscosity of the "unhydrolyzed" sample is due to the fact that hydrolysis of the type described above as controlled acid hydrolysis occurs even during the acid washing step. The dispersion made from these particles however is made up of visibly large particles, is dark and opaque, and shows very high levels of syneresis upon standing. Due to these factors, chitin which has not been subjected to controlled acid hydrolysis described above, is not a suitable binder and is not part of the claimed invention. As the table also indicates, there is no need to extend hydrolysis much beyond 5 minutes when the standard acid wash purification procedures for chitin outlined above are followed.

EXAMPLE 2

Samples of "Avicel" and purified, hydrolyzed, chitin in 5% by weight in 200 gms of water suspensions were set up in a blender by subjecting each to the high speed setting for 30 minutes and both produced uniform dispersions of gel-like consistency. Viscosity measurements were taken immediately afterwards, and it was found that while the chitin dispersion had a viscosity of 2,328 cps, "Avicel" had a viscosity of only 949 cps.

EXAMPLE 3

Samples of purified, acid hydrolyzed chitin and "Avicel" were prepared in the following manner. 200 gms of water were used to make 4.5% by weight suspensions of chitin and "Avicel," and each sample was subjected to a number of passes through a Gaulin Model 15M Homogenizer made by the Manton-Gaulin Co., Everett, Massachusetts by gravity feeding of the samples in an ambient temperature of 74° F. The pressure used for each pass was 8000 psi, and after various passes were completed, viscosity was measured at a temperature of 73° F. on a Brookfield Viscometer Type RVF with a number 4 spindle rotating at 20 RPM. The table below indicates the viscosity at several times from 1 to 12 passes.

Table 2

| After Pass No. | Viscosity Cps. | |
|---|---|---|
| | Avicel | Chitin |
| 0 | 50 | 50 |
| 1 | 190 | 600 |
| 3 | 760 | 4730 |
| 6 | 750 | 5000 |
| 9 | 760 | 5600 |
| 12 | 820 | 6100 |

As this data shows, the chitin product of this invention is extremely thixotropic in nature and in a system where severe shear is used, a much smaller amount of chitin will be equal to a large amount of microcrystalline cellulose in thickening ability. As shown here, the degree of shear is the most important variable in influencing the viscosity of the dispersion of chitin.

In the next three Examples, Atlantic gulf shrimp was used as the chitin source and 5% by weight suspensions of "Avicel" and chitin were set up by subjecting each to shear forces in a blender for 60 minutes. A 200 gm sample of each was then placed in a ½ lb "flat" can i.e., the type of can conventionally used in tuna packing.

As well as being tested for viscosity, the samples in the next three Examples were also tested for syneresis by storing each sample in a 250 ml. graduate for 7 days and measuring the free liquid. Syneresis gives a rapid indication of the uniformity and stability of these gel-like masses. The viscosity and syneresis results are given in the table below.

EXAMPLE 4

A sealed can of purified, hydrolyzed chitin and a can of "Avicel" was held at 70° F. for 7 days.

EXAMPLE 5

A sealed can of purified, hydrolyzed chitin and a can of "Avicel" were subjected to 3 retort sterilization cycles. Each cycle was for 180 minutes and the retort temperature was maintained at 250° F. for each cycle. (The samples were allowed to cool to room temperature after each cycle.)

EXAMPLE 6

A can of purified, hydrolyzed chitin and a can of "Avicel" were frozen in a sharp circulating air freezer. The freezer was maintained at 15° F. and the cans were placed in the freezer for 3 hours. (The cans were then allowed to melt at room temperature and the entire freeze-thaw procedure was repeated two more times.)

Table 3

| Test Conditions | Results | | |
|---|---|---|---|
| | Chitin | | "Avicel" |
| 7 day Storage 70° F. | 0.0% | Syneresis | 12.5% |
| | 2850 cps | Viscosity | 260 cps |
| Retort Sterilization | 0.0% | Syneresis | 14.0% |
| | 3650 cps | Viscosity | 160 cps |
| Freeze-Thaw | 2.5% | Syneresis | 80.0% |
| | 828 cps | Viscosity | 12 cps |

As the data from the table above shows, chitin produces a dispersion which is clearly superior to "Avicel" under conditions of normal storage, repeated retort sterilization and repeated freeze-thaw cycles. While the freeze-thaw cycles and the retort canning cycles are much more severe than frozen or retort canned food products would normally be subjected to, the results of these tests are indicative of the superior stabilizing ability of chitin suspensions.

While the chitin suspension does show a drop in viscosity after 3 freeze-thaw cycles, it exhibits only minimal syneresis. Also, the suspension, after 3 cycles still has a significantly improved viscosity compared to cellulose. The above data illustrates the ability of the chitin of this invention to serve as a thickener-stabilizer for frozen foods which are at least partially fluid when melted, i.e., frozen dinners with gravies or sauces, as well as frozen desserts.

The data on room temperature storage illustrates the ability of chitin to maintain its viscosity and uniformity over significant periods or time. This Example indicates its usefulness as a stabilizer-thickener in foods designed to be kept at room temperature e.g., mayonnaise, peanut butter, etc. Although in emulsion-type foods such as mayonnaise, an emulsifier is still needed, this hydrolyzed chitin, when used in combination with an emulsifier, aids significantly in preventing separation.

It is apparent from the foregoing that refrigerated foods with limited periods of storage e.g., cream substitutes, sour cream, and sour cream substitutes are yet another class of products to which chitin can be beneficially applied.

The ability of the chitin to remain uniform and stable after 3 retort canning cycles amply demonstrates its usefulness in retort canned products e.g., cream style corn or canned foods containing sauces. Also, the chitin can be of particular use in asepticallly canned, high temperature, short time (HTST) products e.g., the so called instant breakfasts, the dietary meals in a can or canned puddings. The high shear developed in some of the tubular heat exchangers used in the HTST processes are, of course, particularly beneficial to the "setting up" of the chitin.

We claim:

1. A food composition having improved thickening properties, said product comprising food material and a uniform, stable aqueous dispersion of microcrystalline chitin, characterized by a multiplicity of randomly spaced ruptured glycosidic bonds, particle sizes substantially invisible at a microscopic magnification of 1600X and having a microcrystalline chitin particle concentration of from 0.5% to 25% by weight of the dispsersion whereby the food product has an improved viscosity and an improved resistance against syneresis.

2. The food composition of claim 1 wherein the concentration of microcrystalline chitin is from 4.5 to 5%.

3. The composition of claim 1 wherein the food material is of a type subjected to high temperature processing.

4. The composition of claim 1 wherein the food material is of a type subjected to repeated freeze thaw cycles.

5. The composition of claim 1 wherein the food material is of a type subjected to refrigeration.

6. The composition of claim 1 wherein the food material is of a type subjected to extended room temperature storage.

7. The composition of claim 1 wherein the food material contains an emulsifier and the microcrystalline chitin acts as a stabilizer.

* * * * *